United States Patent
Chang et al.

(10) Patent No.: US 11,428,902 B2
(45) Date of Patent: Aug. 30, 2022

(54) LENS ASSEMBLY COMPRISING FIVE LENSES OF ++--+ REFRACTIVE POWERS

(71) Applicants: Sintai Optical (Shenzhen) Co., Ltd., ShenZhen (CN); Asia Optical Co., Inc., Taichung (TW)

(72) Inventors: Hsi-Ling Chang, Taichung (TW); Guo-Yang Wu, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 143 days.

(21) Appl. No.: 16/664,998

(22) Filed: Oct. 28, 2019

(65) Prior Publication Data

US 2020/0183131 A1 Jun. 11, 2020

(30) Foreign Application Priority Data

Dec. 10, 2018 (CN) .......................... 201811502220.9

(51) Int. Cl.
*G02B 13/00* (2006.01)
*G02B 9/60* (2006.01)

(52) U.S. Cl.
CPC .......... *G02B 13/0045* (2013.01); *G02B 9/60* (2013.01)

(58) Field of Classification Search
CPC ... G02B 13/0045; G02B 9/60; G02B 9/62–64
See application file for complete search history.

(56) References Cited

U.S. PATENT DOCUMENTS

| | | | |
|---|---|---|---|
| 4,264,138 A * | 4/1981 | Imai | G02B 9/38 359/768 |
| 4,289,385 A | 9/1981 | Yamagata | |
| 4,376,571 A | 3/1983 | Ikemori | |
| 4,812,027 A * | 3/1989 | Yanagisawa | G02B 9/62 359/755 |
| 6,101,049 A * | 8/2000 | Noda | G02B 13/24 359/759 |
| 9,523,841 B1 * | 12/2016 | Chen | G02B 5/208 |
| 2013/0208178 A1 * | 8/2013 | Park | G02B 13/006 348/360 |
| 2019/0121081 A1 * | 4/2019 | Huang | G02B 13/18 |
| 2019/0179101 A1 * | 6/2019 | Li | G02B 7/021 |
| 2021/0048631 A1 * | 2/2021 | Fukaya | G02B 13/0045 |
| 2021/0063707 A1 * | 3/2021 | Chae | G02B 27/0025 |

FOREIGN PATENT DOCUMENTS

| | | |
|---|---|---|
| CN | 105301742 A | 2/2016 |
| CN | 105607232 A | 5/2016 |
| JP | 2015165338 A | 9/2015 |
| KR | 20100062480 A * | 6/2010 |

* cited by examiner

*Primary Examiner* — Wen Huang
(74) *Attorney, Agent, or Firm* — McClure, Qualey & Rodack, LLP

(57) ABSTRACT

A lens assembly includes a first lens, a second lens, a third lens, a fourth lens, and a fifth lens. The first lens is with positive refractive power and includes a convex surface facing an object side and a concave surface facing an image side. The second lens is with positive refractive power. The third lens is with negative refractive power and includes a convex surface facing the object side. The fourth lens is with negative refractive power and includes a concave surface facing the object side. The fifth lens is with positive refractive power and includes a convex surface facing the image side.

14 Claims, 16 Drawing Sheets

LENS ASSEMBLY COMPRISING FIVE LENSES OF ++--+ REFRACTIVE POWERS

BACKGROUND OF THE INVENTION

Field of the Invention

The invention relates to a lens assembly.

Description of the Related Art

The current development trend of a lens assembly is toward miniaturization. Additionally, the lens assembly is developed to have light weight and high resolution capability in accordance with different application requirements. However, the known lens assembly can't satisfy such requirements. Therefore, the lens assembly needs a new structure in order to meet the requirements of miniaturization, light weight, and high resolution at the same time.

BRIEF SUMMARY OF THE INVENTION

The invention provides a lens assembly to solve the above problems. The lens assembly of the invention is provided with characteristics of a shortened total lens length, a lighter weight, a higher resolution, and still has a good optical performance.

The lens assembly in accordance with an exemplary embodiment of the invention includes a first lens, a second lens, a third lens, a fourth lens, and a fifth lens. The first lens is with positive refractive power and includes a convex surface facing an object side and a concave surface facing an image side. The second lens is with positive refractive power. The third lens is with negative refractive power and includes a convex surface facing the object side. The fourth lens is with negative refractive power and includes a concave surface facing the object side. The fifth lens is with positive refractive power and includes a convex surface facing the image side. The first lens, the second lens, the third lens, the fourth lens, and the fifth lens are arranged in order from the object side to the image side along an optical axis.

The lens assembly in accordance with another exemplary embodiment of the invention includes a first lens, a second lens, a third lens, a fourth lens, and a fifth lens. The first lens is with positive refractive power and includes a convex surface facing an object side and a concave surface facing an image side. The second lens is with positive refractive power. The third lens is with negative refractive power. The fourth lens is with negative refractive power and includes a concave surface facing the object side. The fifth lens is with positive refractive power and includes a convex surface facing the image side. The first lens, the second lens, the third lens, the fourth lens, and the fifth lens are arranged in order from the object side to the image side along an optical axis. The lens assembly satisfies: $-13<R_{52}/T_5<-8$; wherein $R_{52}$ is a radius of curvature of the convex surface of the fifth lens and $T_5$ is a thickness of the fifth lens along the optical axis.

The lens assembly in accordance with another exemplary embodiment of the invention includes a first lens, a second lens, a third lens, a fourth lens, and a fifth lens. The first lens is with positive refractive power and includes a convex surface facing an object side and a concave surface facing an image side. The second lens is with positive refractive power. The third lens is with negative refractive power. The fourth lens is with negative refractive power and includes a concave surface facing the object side. The fifth lens is with positive refractive power and includes a convex surface facing the image side. The first lens, the second lens, the third lens, the fourth lens, and the fifth lens are arranged in order from the object side to the image side along an optical axis. The lens assembly satisfies: $12\ mm<f\times(TC_{34}/T_5)<20\ mm$; wherein f is an effective focal length of the lens assembly, $T_5$ is a thickness of the fifth lens along the optical axis, and $TC_{34}$ is an air interval from an image side surface of the third lens to the concave surface of the fourth lens along the optical axis.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
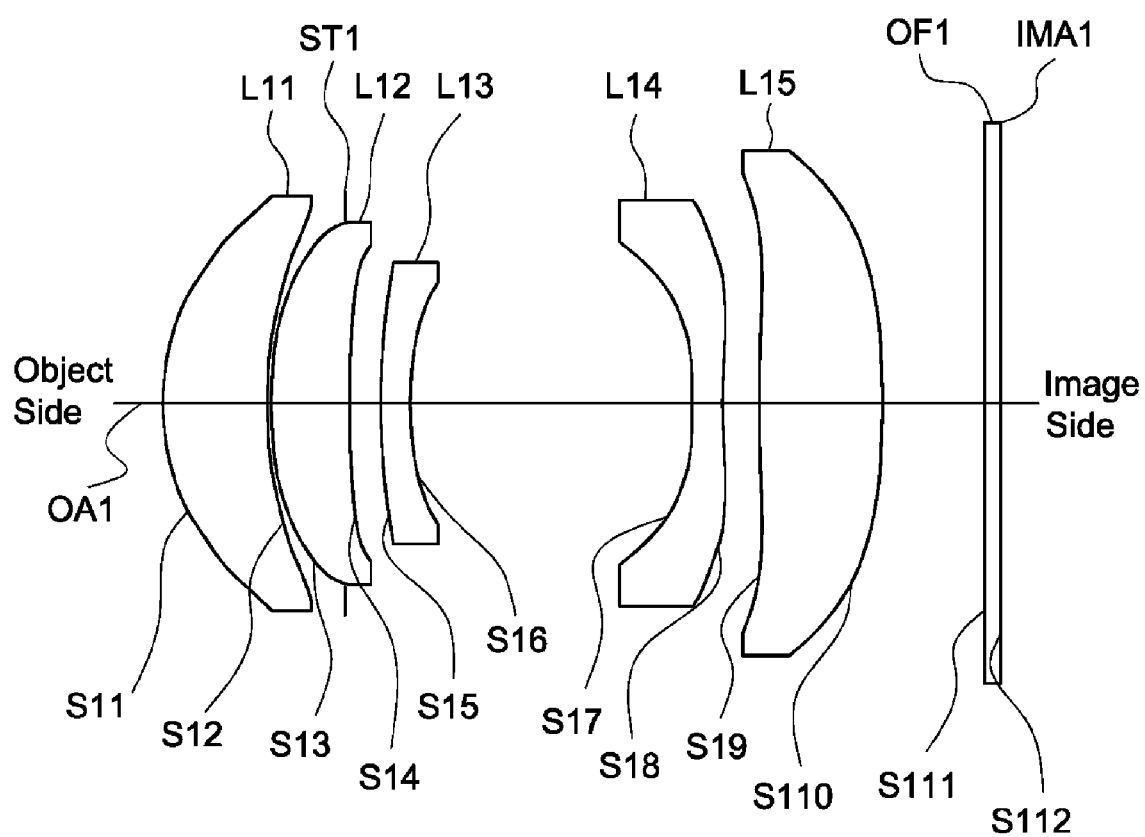
FIG. 1 is a lens layout diagram of a lens assembly in accordance with a first embodiment of the invention.

The following description is made for the purpose of illustrating the general principles of the invention and should not be taken in a limiting sense. The scope of the invention is best determined by reference to the appended claims.

The present invention provides a lens assembly including a first lens, a second lens, a third lens, a fourth lens, and a fifth lens. The first lens is with positive refractive power and includes a convex surface facing an object side and a concave surface facing an image side. The second lens is with positive refractive power. The third lens is with negative refractive power and includes a convex surface facing the object side. The fourth lens is with negative refractive power and includes a concave surface facing the object side. The fifth lens is with positive refractive power and includes a convex surface facing the image side. The first lens, the second lens, the third lens, the fourth lens, and the fifth lens are arranged in order from the object side to the image side along an optical axis.

The present invention provides another lens assembly including a first lens, a second lens, a third lens, a fourth lens, and a fifth lens. The first lens is with positive refractive power and includes a convex surface facing an object side and a concave surface facing an image side. The second lens is with positive refractive power. The third lens is with negative refractive power. The fourth lens is with negative refractive power and includes a concave surface facing the object side. The fifth lens is with positive refractive power and includes a convex surface facing the image side. The first lens, the second lens, the third lens, the fourth lens, and the fifth lens are arranged in order from the object side to the image side along an optical axis. The lens assembly satisfies: $-13<R_{52}/T_5<-8$; wherein $R_{52}$ is a radius of curvature of the convex surface of the fifth lens and $T_5$ is a thickness of the fifth lens along the optical axis.

The present invention provides another lens assembly including a first lens, a second lens, a third lens, a fourth lens, and a fifth lens. The first lens is with positive refractive power and includes a convex surface facing an object side and a concave surface facing an image side. The second lens is with positive refractive power. The third lens is with negative refractive power. The fourth lens is with negative refractive power and includes a concave surface facing the object side. The fifth lens is with positive refractive power and includes a convex surface facing the image side. The first lens, the second lens, the third lens, the fourth lens, and the fifth lens are arranged in order from the object side to the image side along an optical axis. The lens assembly satisfies: 12 mm$<f\times(TC_{34}/T_5)<$20 mm; wherein f is an effective focal length of the lens assembly, $T_5$ is a thickness of the fifth lens along the optical axis, and $TC_{34}$ is an air interval from an image side surface of the third lens to the concave surface of the fourth lens along the optical axis.

Referring to Table 1, Table 2, Table 4, Table 5, Table 7, Table 8, Table 10, and Table 11, wherein Table 1, Table 4, Table 7, and Table 10 show optical specifications in accordance with a first, second, third, and fourth embodiments of the invention respectively and Table 2, Table 5, Table 8, and Table 11 show aspheric coefficients of each surface in Table 1, Table 4, Table 7, and Table 10 respectively.

FIG. 1, FIG. 3, FIG. 5, and FIG. 7 are lens layout diagrams of the lens assembly in accordance with the first, second, third, and fourth embodiments of the invention respectively.

The first lens L11, L21, L31, L41 are with positive refractive power and made of plastic material, wherein the object side surfaces S11, S21, S31, S41 are convex surfaces, the image side surfaces S12, S22, S32, S42 are concave surfaces, and all of the object side surfaces S11, S21, S31, S41 and the image side surfaces S12, S22, S32, S42 are aspheric surfaces.

The second lens L12, L22, L32, L42 are with positive refractive power and made of plastic material, wherein all of the object side surfaces S13, S23, S33, S43 and the image side surfaces S14, S24, S34, S44 are aspheric surfaces.

The third lens L13, L23, L33, L43 are with negative refractive power and made of glass material, wherein all of the object side surfaces S15, S25, S35, S45 and the image side surfaces S16, S26, S36, S46 are aspheric surfaces.

The fourth lens L14, L24, L34, L44 are with negative refractive power and made of plastic material, wherein the object side surfaces S17, S27, S37, S47 are concave surfaces and all of the object side surfaces S17, S27, S37, S47 and the image side surfaces S18, S28, S38, S48 are aspheric surfaces.

The fifth lens L15, L25, L35, L45 are with positive refractive power and made of plastic material, wherein the image side surfaces S110, S210, S310, S410 are convex surfaces and all of the object side surfaces S19, S29, S39, S49 and the image side surfaces S110, S210, S310, S410 are aspheric surfaces.

In addition, the lens assembly 1, 2, 3, 4 satisfy at least one of the following conditions:

$$1<(R_{51}-R_{52})/(R_{51}+R_{52})<10; \quad (1)$$

$$0<f_{12}/f_5<1; \quad (2)$$

$$0<f_{123}/f_5<1; \quad (3)$$

$$12 \text{ mm}<f\times(TC_{34}/T_5)<20 \text{ mm}; \quad (4)$$

$$2<(R_{51}-R_{52})/f<7; \quad (5)$$

$$3<f_5/TC_{34}<6.5; \quad (6)$$

$$0.5<TTL/(f_5-f_2)<7; \quad (7)$$

$$0.5 \text{ mm}<f_5-f_2<4 \text{ mm}; \quad (8)$$

$$-13<R_{52}/T_5<-8; \quad (9)$$

wherein f is an effective focal length of the lens assembly 1, 2, 3, 4 for the first to fourth embodiments, $f_2$ is an effective focal length of the second lens L12, L22, L32, L42 for the first to fourth embodiments, $f_5$ is an effective focal length of the fifth lens L15, L25, L35, L45 for the first to fourth embodiments, $f_{12}$ is an effective focal length of a combination of the first lens L11, L21, L31, L41 and the second lens L12, L22, L32, L42 for the first to fourth embodiments, $f_{123}$ is an effective focal length of a combination of the first lens L11, L21, L31, L41, the second lens L12, L22, L32, L42, and the third lens L13, L23, L33, L43 for the first to fourth embodiments, $R_{51}$ is a radius of curvature of the object side surface S19, S29, S39, S49 of the fifth lens L15, L25, L35, L45 for the first to fourth embodiments, $R_{52}$ is a radius of curvature of the image side surface S110, S210, S310, S410 of the fifth lens L15, L25, L35, L45 for the first to fourth embodiments, TTL is an interval from the object side surface S11, S21, S31, S41 of the first lens L11, L21, L31, L41 to an image plane IMA1, IMA2, IMA3, IMA4 along the optical axis OA1, OA2, OA3, OA4 for the first to fourth embodiments, $T_5$ is a thickness of the fifth lens L15, L25, L35, L45 along the optical axis OA1, OA2, OA3, OA4 for the first to fourth embodiments, and $TC_{34}$ is an air interval from the image side surface S16, S26, S36, S46 of the third lens L13, L23, L33, L43 to an object side surface S17, S27, S37, S47 of the fourth lens L14, L24, L34, L44 along the optical axis OA1, OA2, OA3, OA4 for the first to fourth embodiments. Making the lens assembly 1, 2, 3, 4 can effectively shorten the total lens length, effectively decrease the total lens weight, effectively increase resolution, effectively correct aberration, and effectively correct chromatic aberration.

The combined effective focal length $f_{123}$ and the effective focal length $f_5$ affect light refraction ability. If the effective focal length $f_5$ is too large or too small, it will affect the manufacturing sensitivity and image quality of the lens assembly. Therefore, when the condition (3): $0<f_{123}/f_5<1$ is satisfied, the manufacturing sensitivity of the lens assembly can be reduced to improve image quality.

The thickness $T_5$ affects the thickness ratio of the center and edge of the fifth lens. If the thickness ratio of the center and edge of the fifth lens is too large or too small, it will affect the manufacture of the fifth lens. Therefore, when the condition (4): $12\text{ mm}<f\times(TC_{34}/T_5)<20\text{ mm}$ is satisfied, the problem of lens forming can be reduced and is beneficial to the manufacture of the fifth lens.

The radius of curvature $R_{52}$ affects the refraction angle of light and the location where the light is concentrated. If the radius of curvature $R_{52}$ is too large, it will introduce more aberration and hard to manufacture the fifth lens. Therefore, when the condition (9): $-13<R_{52}/T_5<-8$ is satisfied, preventing the radius of curvature of the image side surface of the fifth lens from being too large, so as to effectively correct aberration, and is beneficial to the manufacture of the fifth lens.

A detailed description of a lens assembly in accordance with a first embodiment of the invention is as follows. Referring to FIG. 1, the lens assembly 1 includes a first lens L11, a stop ST1, a second lens L12, a third lens L13, a fourth lens L14, a fifth lens L15, and an optical filter OF1, all of which are arranged in order from an object side to an image side along an optical axis OA1. In operation, an image of light rays from the object side is formed at an image plane IMA1.

According to the foregoing, the second lens L12 is a meniscus lens, wherein the object side surface S13 is a convex surface and the image side surface S14 is a concave surface; the third lens L13 is a meniscus lens, wherein the object side surface S15 is a convex surface and the image side surface S16 is a concave surface; the fourth lens L14 is a biconcave lens, wherein the image side surface S18 is a concave surface; the fifth lens L15 is biconvex lens, wherein the object side surface S19 is a convex surface; and both of the object side surface S111 and image side surface S112 of the optical filter OF1 are plane surfaces.

With the above design of the lenses and stop ST1 and at least any one of the conditions (1)-(9) satisfied, the lens assembly 1 can have an effective shortened total lens length, an effective decreased total lens weight, an effective increased resolution and is capable of an effective corrected aberration and an effective corrected chromatic aberration.

Table 1 shows the optical specification of the lens assembly 1 in FIG. 1.

TABLE 1

Effective Focal Length = 7.141865 mm
F-number = 2.49
Total Lens Length = 6.029 mm
Field of View = 30.74 Degrees

| Surface Number | Radius of Curvature (mm) | Thickness (mm) | Nd | Vd | Effective Focal Length (mm) | Remark |
|---|---|---|---|---|---|---|
| S11 | 1.67328 | 0.755174 | 1.54 | 56.0 | 5.031614 | The First Lens L11 |
| S12 | 3.601476 | 0.02368 | | | | |
| S13 | 2.855332 | 0.566664 | 1.54 | 56.0 | 7.017226 | The Second Lens L12 (Stop ST1) |
| S14 | 10.44024 | 0.224379 | | | | |
| S15 | 8.880761 | 0.215466 | 2 | 19.3 | -4.062907 | The Third Lens L13 |
| S16 | 2.7745 | 2.027069 | | | | |
| S17 | -3.18864 | 0.215466 | 1.54 | 56.0 | -3.636419 | The Fourth Lens L14 |
| S18 | 5.383979 | 0.270059 | | | | |
| S19 | 14.66274 | 0.88132 | 1.65 | 21.5 | 8.299007 | The Fifth Lens L15 |
| S110 | -8.4613 | 0.74 | | | | |
| S111 | ∞ | 0.11 | 1.52 | 64.17 | | Optical Filter OF1 |
| S112 | ∞ | 0 | | | | |

The aspheric surface sag z of each lens in table 1 can be calculated by the following formula:

$$z = ch^2/\{1+[1-(k+1)c^2h^2]^{1/2}\}+Ah^4+Bh^6+Ch^8+Dh^{10}+Eh^{12}+Fh^{14}+Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each surface are shown in Table 2.

TABLE 2

| Surface Number | k | A<br>E | B<br>F | C<br>G | D |
|---|---|---|---|---|---|
| S11 | -0.33986 | 0.00262077<br>0.00018517 | 0.00079832<br>-0.00003061 | 0.0009999<br>-0.00005279 | -0.00054435 |
| S12 | 0.83354 | 0.00227978<br>-0.00333547 | 0.008953<br>-0.00019717 | 0.0029332<br>0.00033443 | 0.00113949 |
| S13 | 3.580804 | -0.00300124<br>0.00024859 | 0.00613123<br>0.00045168 | 0.00182432<br>-0.00018211 | -0.00007643 |
| S14 | 77.07078 | 0.0001355<br>0.00490266 | -0.00052424<br>0.00182585 | 0.00489103<br>-0.00221119 | 0.00537513 |
| S15 | 65.31667 | 0.01094588<br>0.00310212 | 0.00772969<br>0.00457532 | -0.00579761<br>-0.00997896 | -0.00580023 |

TABLE 2-continued

| Surface Number | k | A<br>E | B<br>F | C<br>G | D |
|---|---|---|---|---|---|
| S16 | 6.814224 | 0.02617933<br>0.01314532 | 0.00324791<br>0.01224083 | 0.01548823<br>−0.04473239 | −0.03688553 |
| S17 | 4.09449 | −0.16296479<br>0.00305658 | −0.0085734<br>−0.00006769 | 0.022288<br>−0.00190305 | −0.00033056 |
| S18 | −56.6431 | −0.08936004<br>0.00140722 | −0.00881086<br>−0.00048868 | 0.00746188<br>−0.0000157 | −0.00043598 |
| S19 | −33.1362 | −0.0058725<br>0.00025373 | −0.0102324<br>0.00007994 | −0.00130227<br>−0.00002605 | 0.00002037 |
| S110 | 9.426623 | −0.06038844<br>−0.00000089 | 0.01371605<br>0.00000137 | −0.00165048<br>0.00000545 | −0.00039764 |

Table 3 shows the parameters and condition values for conditions (1)-(9) in accordance with the first embodiment of the invention. It can be seen from Table 3 that the lens assembly 1 of the first embodiment satisfies the conditions (1)-(9).

TABLE 3

| $f_{12}$ | 3.108 mm | $f_{123}$ | 5.5999 mm | $T_5$ | 0.88132 mm |
|---|---|---|---|---|---|
| $TC_{34}$ | 2.027069 mm | | | | |
| $(R_{51} - R_{52})/(R_{51} + R_{52})$ | 3.73 | $f_{12}/f_5$ | 0.37 | $f_{123}/f_5$ | 0.67 |
| $f \times (TC_{34}/T_5)$ | 17.06 mm | $(R_{51} - R_{52})/f$ | 3.12 | $f_5/TC_{34}$ | 4.09 |
| $TTL/(f_5 - f_2)$ | 4.70 | $f_5 - f_2$ | 1.28 mm | $R_{52}/T_5$ | −9.60 |

Figure 2A:
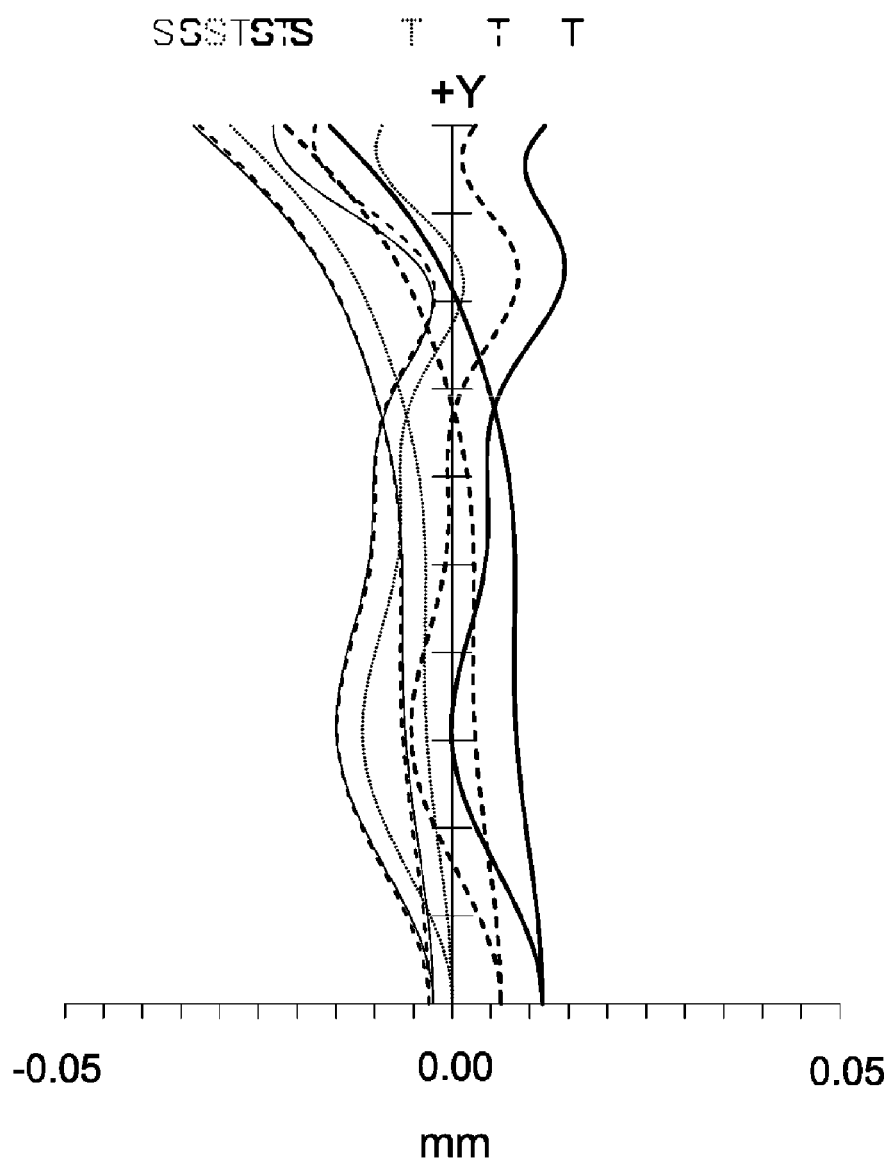
FIG. 2A depicts a field curvature diagram of the lens assembly in accordance with the first embodiment of the invention.
Figure 2B:
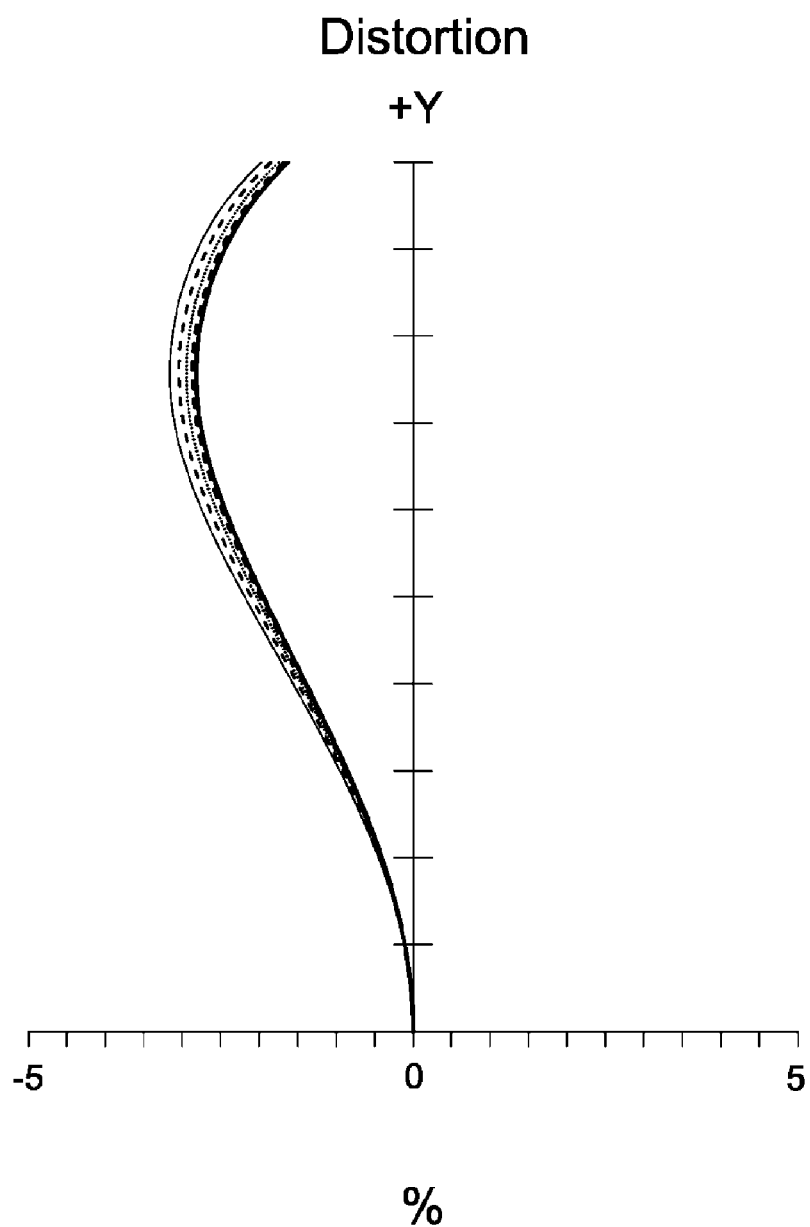
FIG. 2B is a distortion diagram of the lens assembly in accordance with the first embodiment of the invention.
Figure 2C:
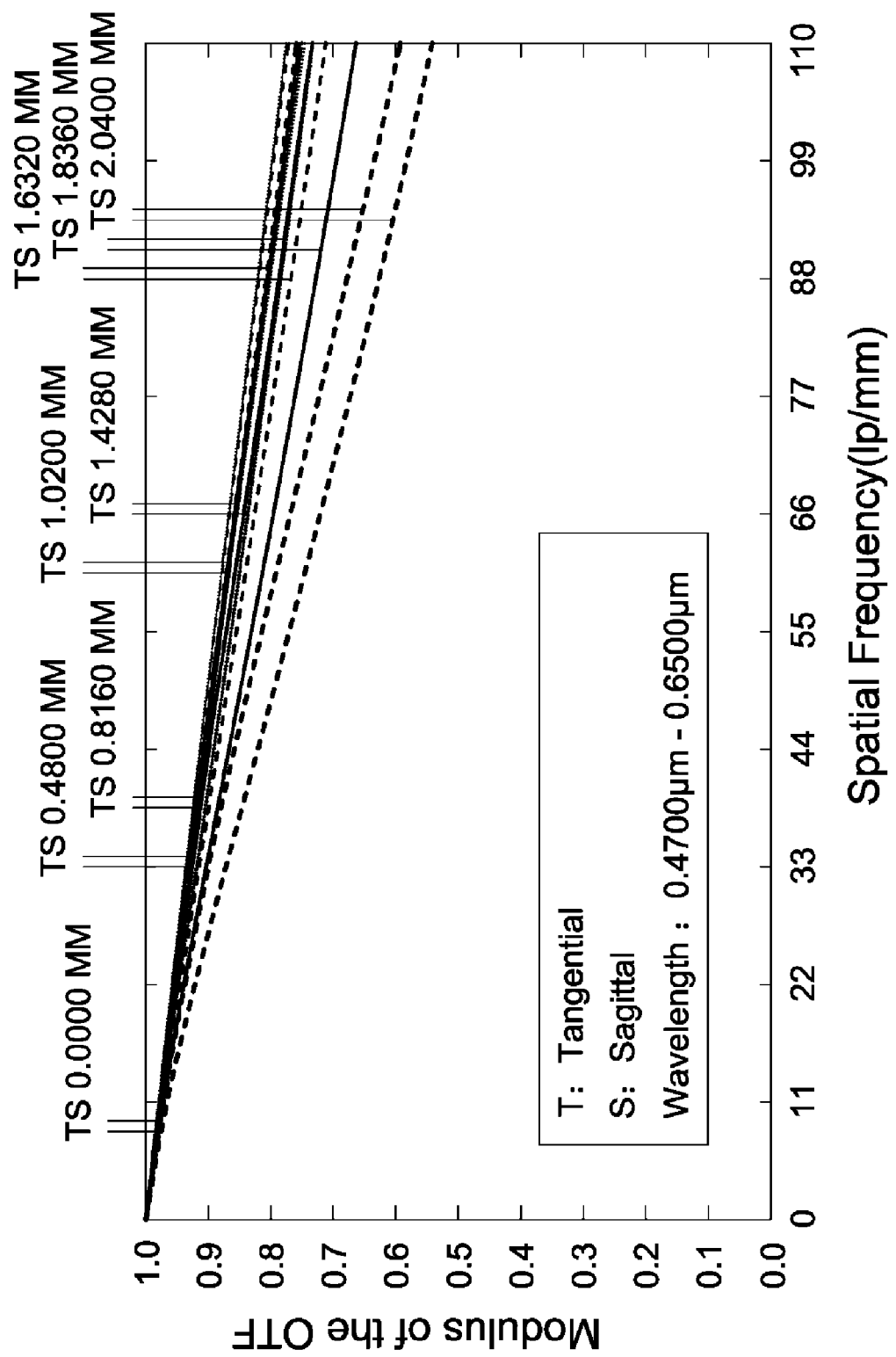
FIG. 2C is a modulation transfer function diagram of the lens assembly in accordance with the first embodiment of the invention.

By the above arrangements of the lenses and stop ST1, the lens assembly 1 of the first embodiment can meet the requirements of optical performance as seen in FIGS. 2A-2C, wherein FIG. 2A shows a field curvature diagram of the lens assembly 1 in accordance with the first embodiment of the invention, FIG. 2B shows a distortion diagram of the lens assembly 1 in accordance with the first embodiment of the invention, and FIG. 2C shows a modulation transfer function diagram of the lens assembly 1 in accordance with the first embodiment of the invention.

It can be seen from FIG. 2A that the field curvature of tangential direction and sagittal direction in the lens assembly 1 of the first embodiment ranges from −0.04 mm to 0.02 mm.

It can be seen from FIG. 2B that the distortion in the lens assembly 1 of the first embodiment ranges from −4% to 0%.

It can be seen from FIG. 2C that the modulation transfer function of tangential direction and sagittal direction in the lens assembly 1 of the first embodiment ranges from 0.54 to 1.0.

It is obvious that the field curvature and the distortion of the lens assembly 1 of the first embodiment can be corrected effectively, and the resolution of the lens assembly 1 of the first embodiment can meet the requirement. Therefore, the lens assembly 1 of the first embodiment is capable of good optical performance.

Figure 3:
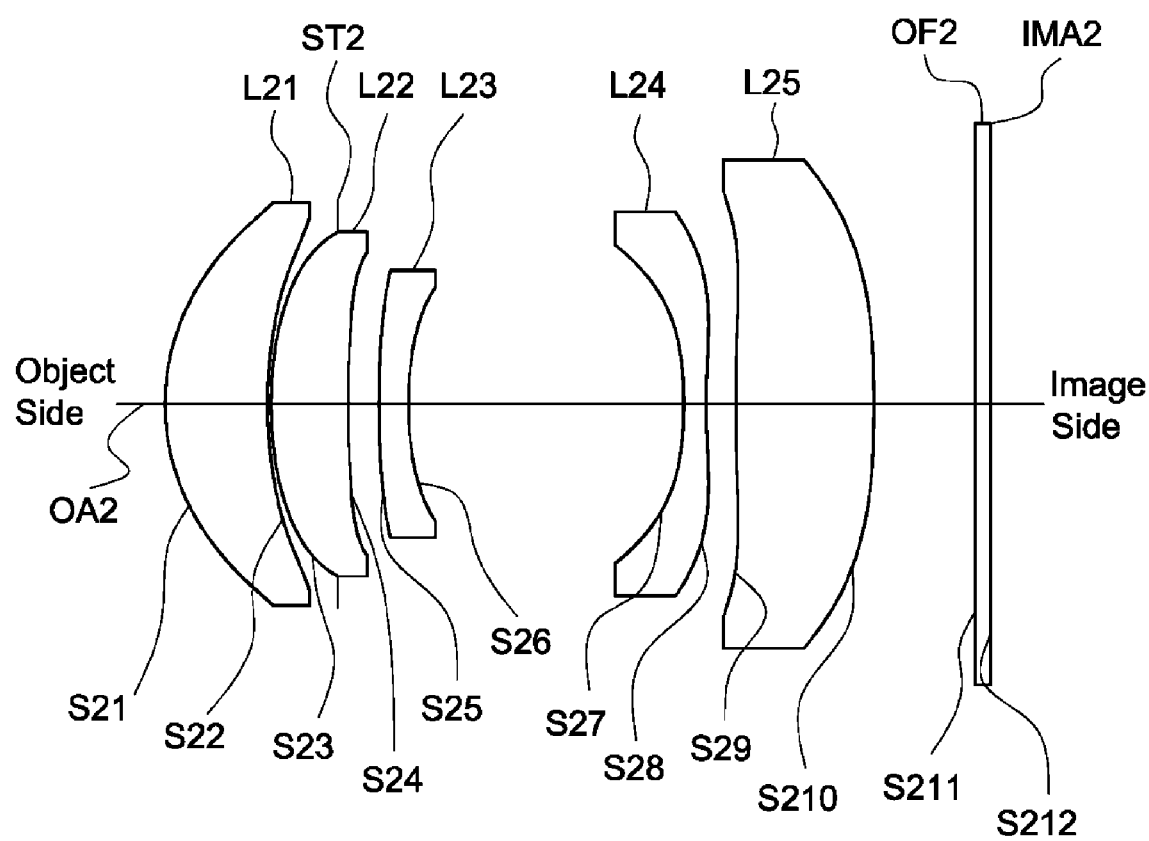
FIG. 3 is a lens layout diagram of a lens assembly in accordance with a second embodiment of the invention.

Referring to FIG. 3, FIG. 3 is a lens layout diagram of a lens assembly in accordance with a second embodiment of the invention. The lens assembly 2 includes a first lens L21, a stop ST2, a second lens L22, a third lens L23, a fourth lens L24, a fifth lens L25, and an optical filter OF2, all of which are arranged in order from an object side to an image side along an optical axis OA2. In operation, an image of light rays from the object side is formed at an image plane IMA2.

According to the foregoing, the surface profiles of the second lens L22, the third lens L23, the fourth lens L24, and the fifth lens L25 approximate to that of the second lens L12, the third lens L13, the fourth lens L14, and the fifth lens L15 of the lens assembly 1 of the first embodiment respectively, and is not described here again; and both of the object side surface S211 and image side surface S212 of the optical filter OF2 are plane surfaces.

With the above design of the lenses and stop ST2 and at least any one of the conditions (1)-(9) satisfied, the lens assembly 2 can have an effective shortened total lens length, an effective decreased total lens weight, an effective increased resolution and is capable of an effective corrected aberration and an effective corrected chromatic aberration.

Table 4 shows the optical specification of the lens assembly 2 in FIG. 3.

TABLE 4

Effective Focal Length = 7.27028 mm
F-number = 2.49
Total Lens Length = 6.0438 mm
Field of View = 31.15 Degrees

| Surface Number | Radius of Curvature (mm) | Thickness (mm) | Nd | Vd | Effective Focal Length (mm) | Remark |
|---|---|---|---|---|---|---|
| S21 | 1.67405 | 0.752548 | 1.54 | 56.0 | 5.030682 | The First Lens L21 |
| S22 | 3.609456 | 0.023928 | | | | |
| S23 | 2.855205 | 0.566819 | 1.54 | 56.0 | 7.016294 | The Second |

TABLE 4-continued

Effective Focal Length = 7.27028 mm
F-number = 2.49
Total Lens Length = 6.0438 mm
Field of View = 31.15 Degrees

| Surface Number | Radius of Curvature (mm) | Thickness (mm) | Nd | Vd | Effective Focal Length (mm) | Remark |
|---|---|---|---|---|---|---|
| S24 | 10.44223 | 0.224454 | | | | Lens L22 (Stop ST2) |
| S25 | 8.877951 | 0.215777 | 2 | 19.3 | −4.064958 | The Third Lens L23 |
| S26 | 2.775119 | 2.016513 | | | | |
| S27 | −3.34988 | 0.165867 | 1.54 | 56.0 | −3.873128 | The Fourth Lens L24 |
| S28 | 5.831732 | 0.215003 | | | | |
| S29 | 13.37145 | 1.012948 | 1.65 | 21.5 | 8.874061 | The Fifth Lens L25 |
| S210 | −10.0113 | 0.74 | | | | |
| S211 | ∞ | 0.11 | 1.52 | 64.17 | | Optical Filter OF2 |
| S212 | ∞ | 0 | | | | |

The definition of aspheric surface sag z of each lens in table 4 is the same as that of in Table 1, and is not described here again.

In the second embodiment, the conic constant k and the aspheric coefficients A, B, C, D, E, F, G of each surface are shown in Table 5.

Figure 4A:
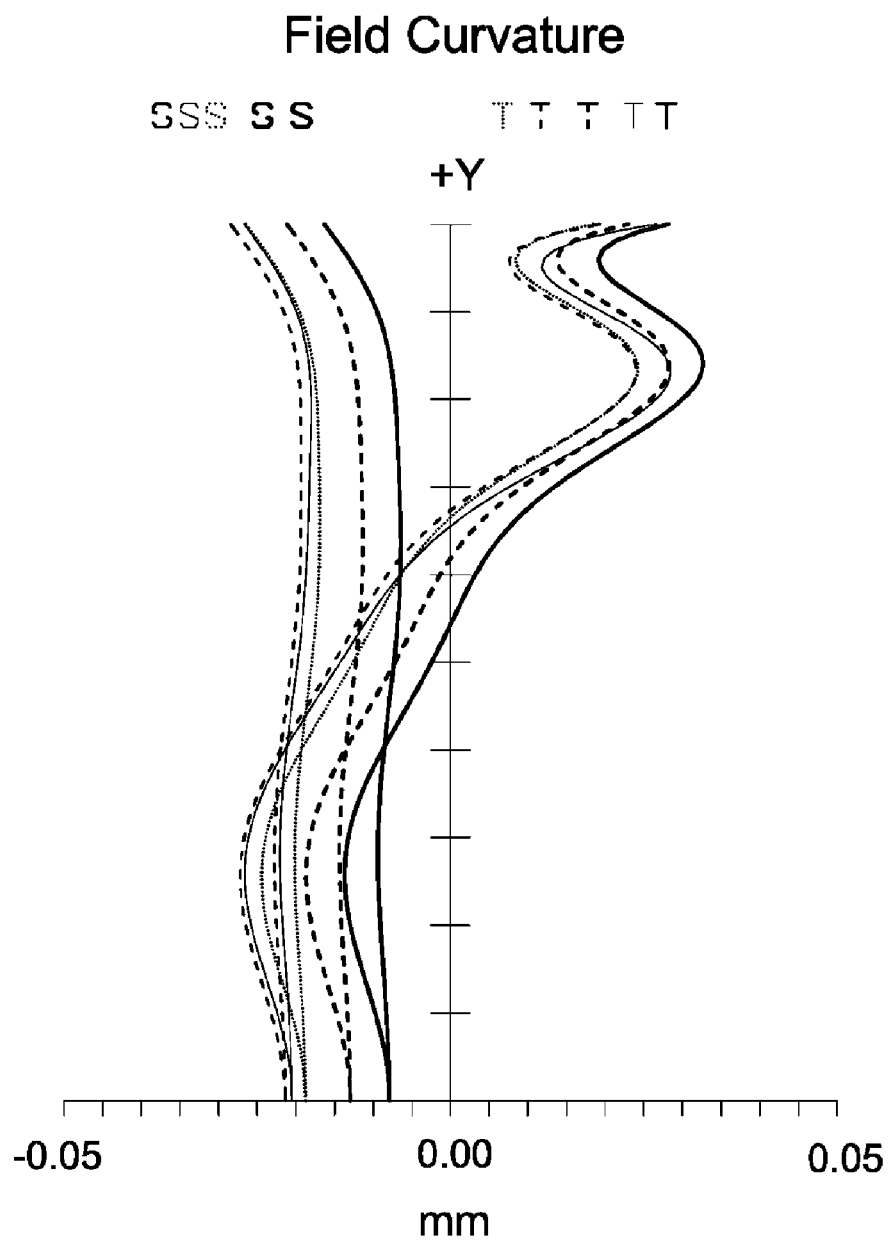
FIG. 4A depicts a field curvature diagram of a lens assembly in accordance with the second embodiment of the invention.
Figure 4B:
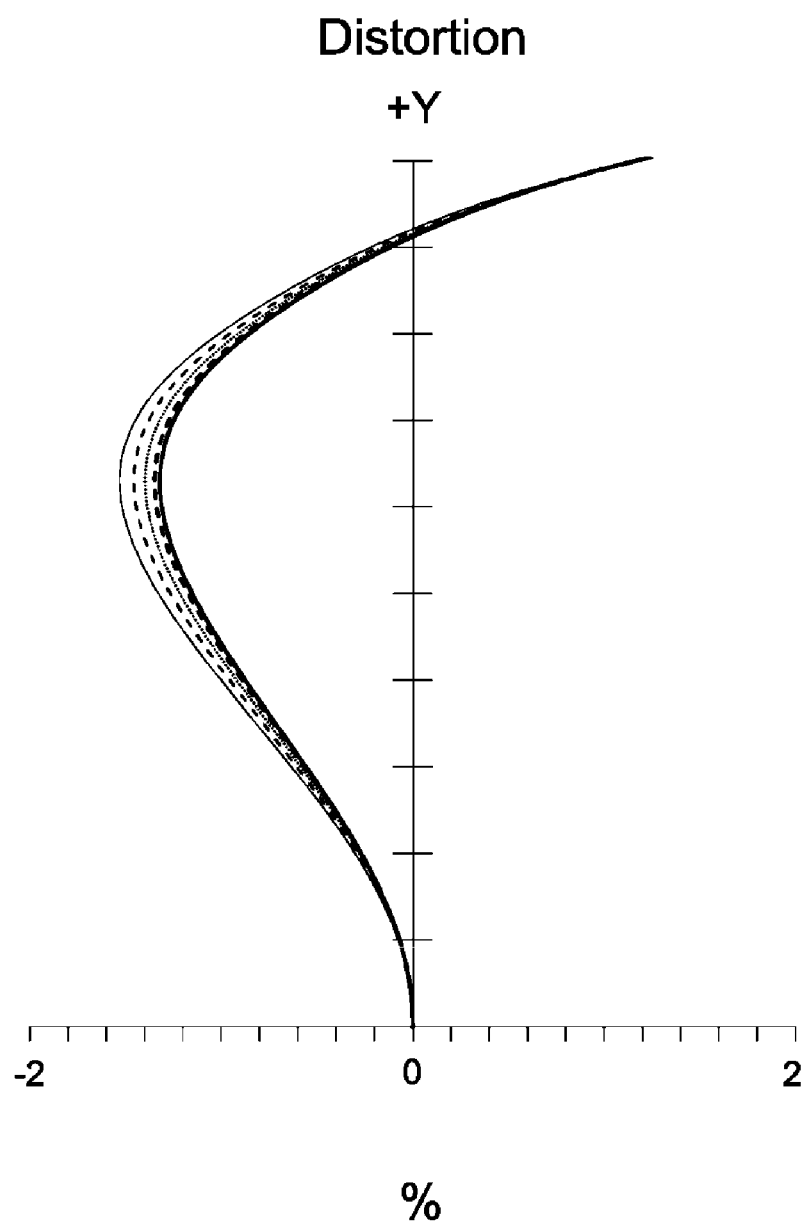
FIG. 4B is a distortion diagram of the lens assembly in accordance with the second embodiment of the invention.
Figure 4C:
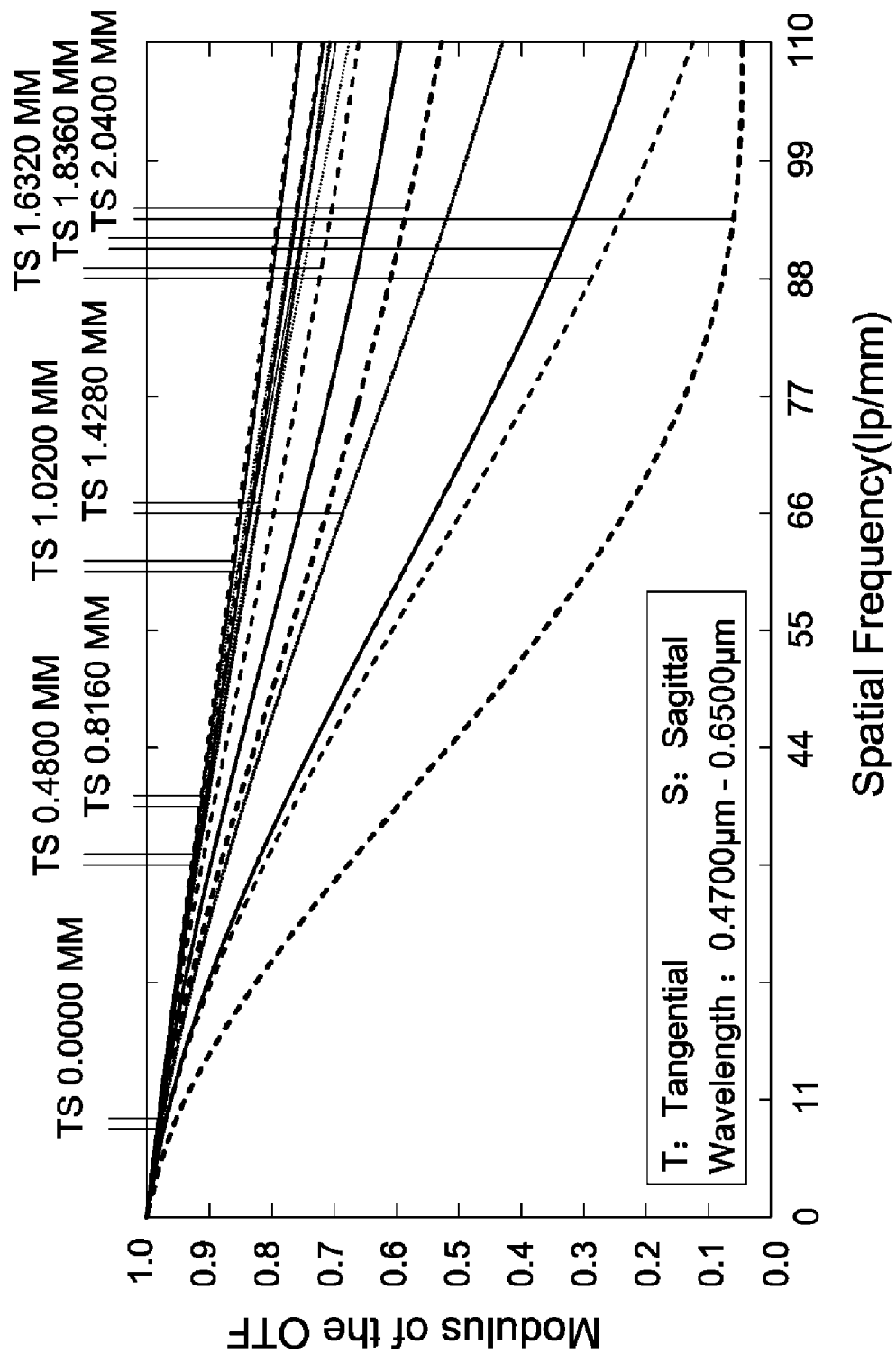
FIG. 4C is a modulation transfer function diagram of the lens assembly in accordance with the second embodiment of the invention.

By the above arrangements of the lenses and stop ST2, the lens assembly 2 of the second embodiment can meet the requirements of optical performance as seen in FIGS. 4A-4C, wherein FIG. 4A shows a field curvature diagram of the lens assembly 2 in accordance with the second embodi-

TABLE 5

| Surface Number | k | A<br>E | B<br>F | C<br>G | D |
|---|---|---|---|---|---|
| S21 | −0.33946 | 0.00263054<br>0.0001859 | 0.00081158<br>−0.00003035 | 0.00100546<br>−0.0000527 | −0.00054233 |
| S22 | 0.828602 | 0.0022578<br>−0.003334844 | 0.00894475<br>−0.00019668 | 0.00293158<br>0.00033475 | 0.00113982 |
| S23 | 3.581061 | −0.00304527<br>0.00025154 | 0.00615543<br>0.00045214 | 0.00184407<br>−0.00018245 | −0.00006745 |
| S24 | 77.0624 | −0.00010628<br>0.00493687 | −0.00063219<br>0.00185547 | 0.00487389<br>−0.00219023 | 0.00539939 |
| S25 | 65.33968 | 0.01084233<br>0.00308111 | 0.00761154<br>0.00458402 | −0.00589345<br>−0.00994881 | −0.00585795 |
| S26 | 6.811338 | 0.02678095<br>0.01338614 | 0.0040238<br>0.01184292 | 0.01625755<br>−0.0459912 | −0.03621259 |
| S27 | 3.924812 | −0.15566404<br>0.00304735 | −0.006968<br>0.00011078 | 0.02232777<br>−0.00185721 | −0.00016555 |
| S28 | −58.7627 | −0.09262289<br>0.00137342 | −0.00932683<br>−0.00050455 | 0.00728149<br>−0.00002365 | −0.00051316 |
| S29 | −74.959 | −0.0063308<br>0.00026367 | −0.01019622<br>0.00008384 | −0.00125757<br>−0.00002457 | 0.00004385 |
| S210 | 1.155445 | −0.0563828<br>0.00000222 | 0.01436284<br>0.00000157 | −0.00153269<br>0.00000535 | −0.00037666 |

Table 6 shows the parameters and condition values for conditions (1)-(9) in accordance with the second embodiment of the invention. It can be seen from Table 6 that the lens assembly 2 of the second embodiment satisfies the conditions (1)-(9).

ment of the invention, FIG. 4B shows a distortion diagram of the lens assembly 2 in accordance with the second embodiment of the invention, and FIG. 4C shows a modulation transfer function diagram of the lens assembly 2 in accordance with the second embodiment of the invention.

TABLE 6

| | | | | | |
|---|---|---|---|---|---|
| $f_{12}$ | 3.10735 mm | $f_{123}$ | 5.59501 mm | $T_5$ | 1.012948 mm |
| $TC_{34}$ | 2.016513 mm | | | | |
| $(R_{51} - R_{52})/(R_{51} + R_{52})$ | 6.96 | $f_{12}/f_5$ | 0.35 | $f_{123}/f_5$ | 0.63 |
| $f \times (TC_{34}/T_5)$ | 14.47 mm | $(R_{51} - R_{52})/f$ | 3.22 | $f_5/TC_{34}$ | 4.40 |
| $TTL/(f_5 - f_2)$ | 3.25 | $f_5 - f_2$ | 1.86 mm | $R_{52}/T_5$ | −9.88 |

It can be seen from FIG. 4A that the field curvature of tangential direction and sagittal direction in the lens assembly 2 of the second embodiment ranges from −0.03 mm to 0.04 mm.

It can be seen from FIG. 4B that the distortion in the lens assembly 2 of the second embodiment ranges from −1.6% to 1.4%.

It can be seen from FIG. 4C that the modulation transfer function of tangential direction and sagittal direction in the lens assembly 2 of the second embodiment ranges from 0.05 to 1.0.

It is obvious that the field curvature and the distortion of the lens assembly 2 of the second embodiment can be corrected effectively, and the resolution of the lens assembly 2 of the second embodiment can meet the requirement. Therefore, the lens assembly 2 of the second embodiment is capable of good optical performance.

Figure 5:
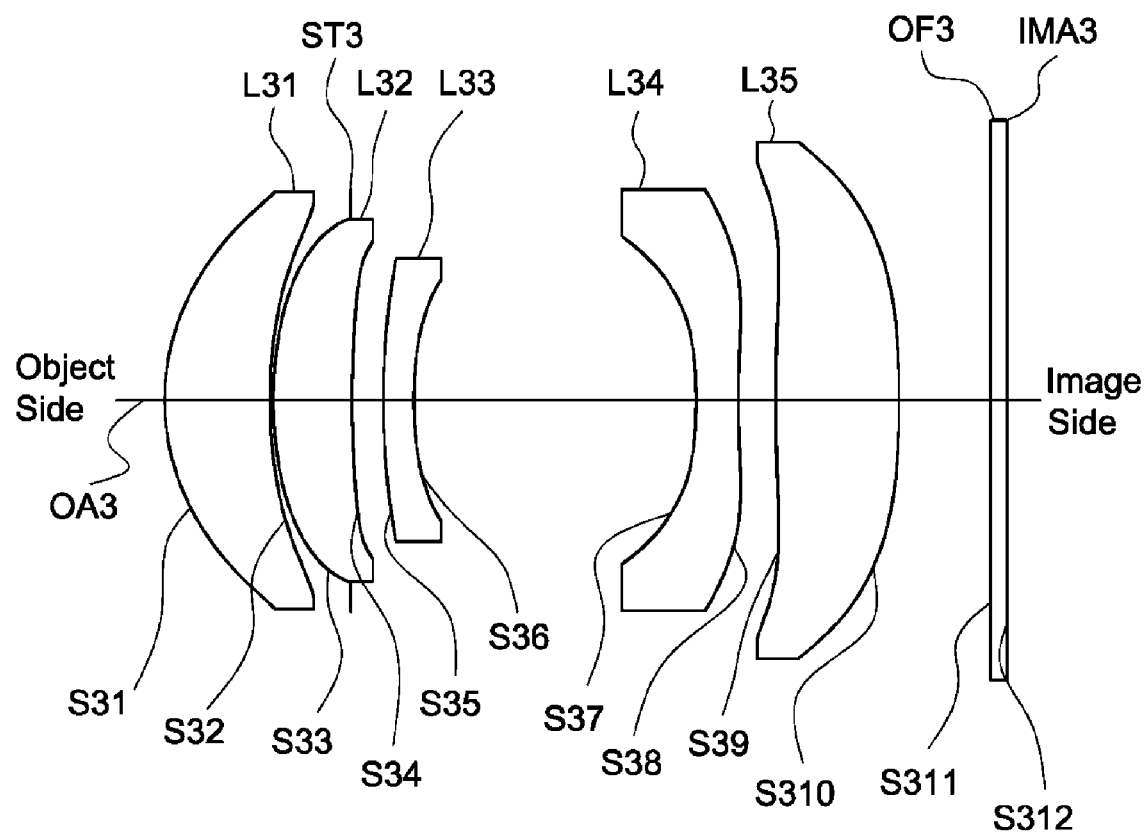
FIG. 5 is a lens layout diagram of a lens assembly in accordance with a third embodiment of the invention.

Referring to FIG. 5, FIG. 5 is a lens layout diagram of a lens assembly in accordance with a third embodiment of the invention. The lens assembly 3 includes a first lens L31, a stop ST3, a second lens L32, a third lens L33, a fourth lens L34, a fifth lens L35, and an optical filter OF3, all of which are arranged in order from an object side to an image side along an optical axis OA3. In operation, an image of light rays from the object side is formed at an image plane IMA3.

According to the foregoing, the surface profiles of the second lens L32, the third lens L33, the fourth lens L34, and the fifth lens L35 approximate to that of the second lens L12, the third lens L13, the fourth lens L14, and the fifth lens L15 of the lens assembly 1 of the first embodiment respectively, and is not described here again; and both of the object side surface S311 and image side surface S312 of the optical filter OF3 are plane surfaces.

With the above design of the lenses and stop ST3 and at least any one of the conditions (1)-(9) satisfied, the lens assembly 3 can have an effective shortened total lens length, an effective decreased total lens weight, an effective increased resolution and is capable of an effective corrected aberration and an effective corrected chromatic aberration.

Table 7 shows the optical specification of the lens assembly 3 in FIG. 5.

TABLE 7

Effective Focal Length = 7.33967 mm
F-number = 2.49
Total Lens Length = 6.0371 mm
Field of View = 31.06 Degrees

| Surface Number | Radius of Curvature (mm) | Thickness (mm) | Nd | Vd | Effective Focal Length (mm) | Remark |
|---|---|---|---|---|---|---|
| S31 | 1.673421 | 0.755174 | 1.54 | 56.0 | 5.031538 | The First Lens L31 |
| S32 | 3.602395 | 0.02368 | | | | |
| S33 | 2.855105 | 0.566664 | 1.54 | 56.0 | 7.015927 | The Second Lens L32 (Stop ST3) |
| S34 | 10.44258 | 0.224379 | | | | |
| S35 | 8.879271 | 0.215466 | 2 | 19.3 | −4.063839 | The Third Lens L33 |
| S36 | 2.774782 | 2.02588 | | | | |
| S37 | −3.21148 | 0.30161 | 1.54 | 56.0 | −3.682687 | The Fourth Lens L34 |
| S38 | 5.552572 | 0.270059 | | | | |
| S39 | 13.387 | 0.88132 | 1.65 | 21.5 | 7.968103 | The Fifth Lens L35 |
| S310 | −8.36016 | 0.66 | | | | |
| S311 | ∞ | 0.11 | 1.52 | 64.17 | | Optical Filter OF3 |
| S312 | ∞ | 0.002877 | | | | |

The definition of aspheric surface sag z of each lens in table 7 is the same as that of in Table 1, and is not described here again.

In the third embodiment, the conic constant k and the aspheric coefficients A, B, C, D, E, F, G of each surface are shown in Table 8.

TABLE 8

| Surface Number | k | A<br>E | B<br>F | C<br>G | D |
|---|---|---|---|---|---|
| S31 | −0.33966 | 0.00262472<br>0.00018542 | 0.00080618<br>−0.00003057 | 0.00100311<br>−0.0000528 | −0.00054335 |
| S32 | 0.832257 | 0.00227292<br>−0.0033351 | 0.00895114<br>−0.00019696 | 0.00293335<br>0.00033454 | 0.00113998 |
| S33 | 3.581372 | −0.00301456<br>0.00025453 | 0.00615908<br>0.00045267 | 0.00185012<br>−0.00018301 | −0.00006158 |
| S34 | 77.03975 | 0.00000601<br>0.00492262 | −0.00054768<br>0.00183897 | 0.00490752<br>−0.00220377 | 0.00539943 |
| S35 | 65.3412 | 0.01092226<br>0.00311222 | 0.00770193<br>0.00459192 | −0.00581187<br>−0.0099589 | −0.00580051 |
| S36 | 6.814627 | 0.02644147<br>0.0132668 | 0.00359409<br>0.0122021 | 0.01581065<br>−0.04497192 | −0.03664249 |
| S37 | 4.114142 | −0.16001979<br>0.00290296 | −0.00806013<br>−0.00018653 | 0.02218778<br>−0.00199117 | −0.0005062 |
| S38 | −45.1016 | −0.09077285<br>0.00141522 | −0.00909447<br>−0.0004832 | 0.00741809<br>−0.00001268 | −0.00043273 |
| S39 | −32.7644 | −0.00574285<br>0.00025214 | −0.01017462<br>0.00007904 | −0.0012926<br>−0.00002645 | 0.00001946 |
| S310 | 9.806675 | −0.06010322<br>−0.00000217 | 0.01364096<br>0.0000012 | −0.00167892<br>0.00000545 | −0.00040437 |

Table 9 shows the parameters and condition values for conditions (1)-(9) in accordance with the third embodiment of the invention. It can be seen from Table 9 that the lens assembly 3 of the third embodiment satisfies the conditions (1)-(9).

With the above design of the lenses and stop ST4 and at least any one of the conditions (1)-(9) satisfied, the lens assembly 4 can have an effective shortened total lens length, an effective decreased total lens weight, an effective increased resolution and is capable of an effective corrected aberration and an effective corrected chromatic aberration.

TABLE 9

| | | | | | |
|---|---|---|---|---|---|
| $f_{12}$ | 3.01841 mm | $f_{123}$ | 5.59714 mm | $T_5$ | 0.88132 mm |
| $TC_{34}$ | 2.02588 mm | | | | |
| $(R_{51} - R_{52})/(R_{51} + R_{52})$ | 4.33 | $f_{12}/f_5$ | 0.38 | $f_{123}/f_5$ | 0.70 |
| $f \times (TC_{34}/T_5)$ | 16.87 mm | $(R_{51} - R_{52})/f$ | 2.96 | $f_5/TC_{34}$ | 3.93 |
| $TTL/(f_5 - f_2)$ | 6.34 | $f_5 - f_2$ | 0.95 mm | $R_{52}/T_5$ | -9.49 |

Figure 6A:
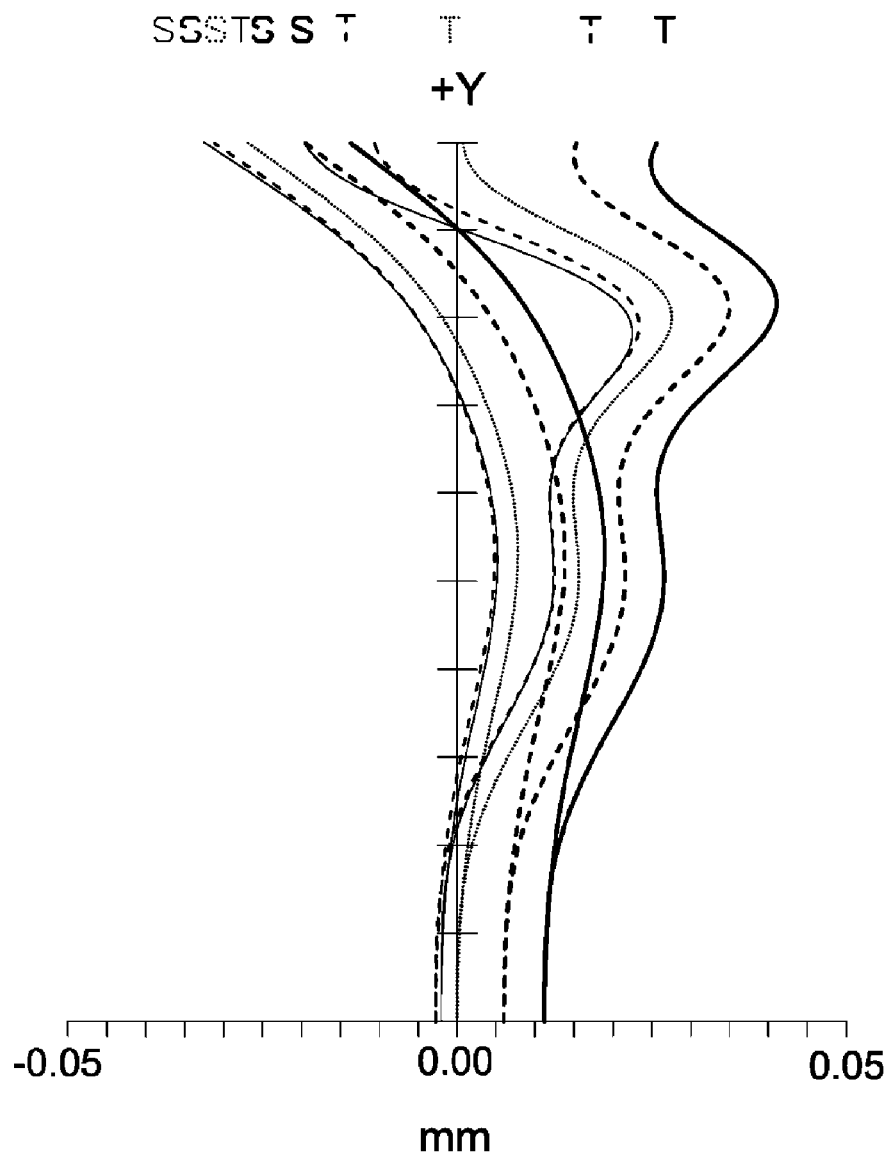
FIG. 6A depicts a field curvature diagram of a lens assembly in accordance with the third embodiment of the invention.
Figure 6B:
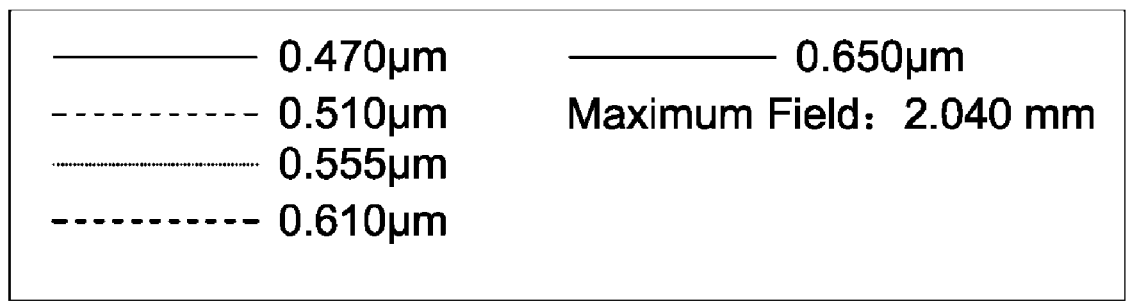
FIG. 6B is a distortion diagram of the lens assembly in accordance with the third embodiment of the invention.
Figure 6B:
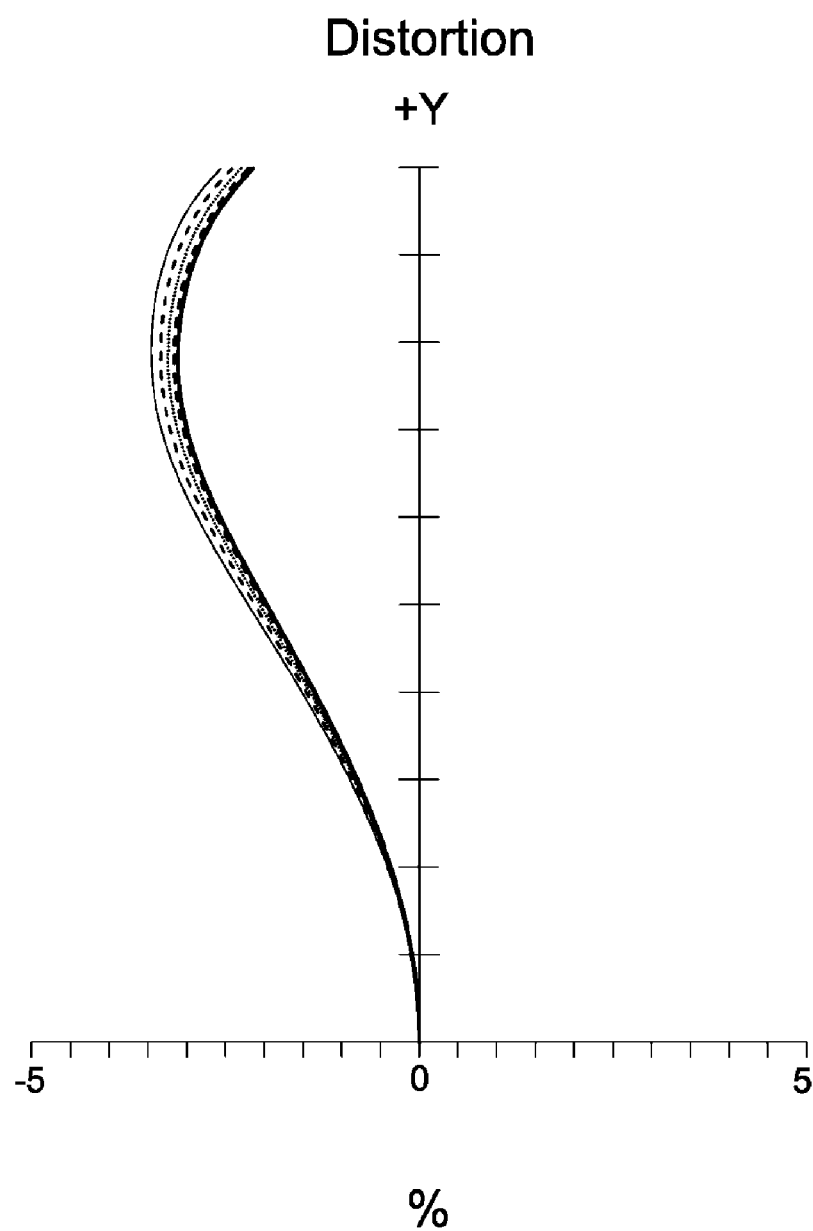
Figure 6C:
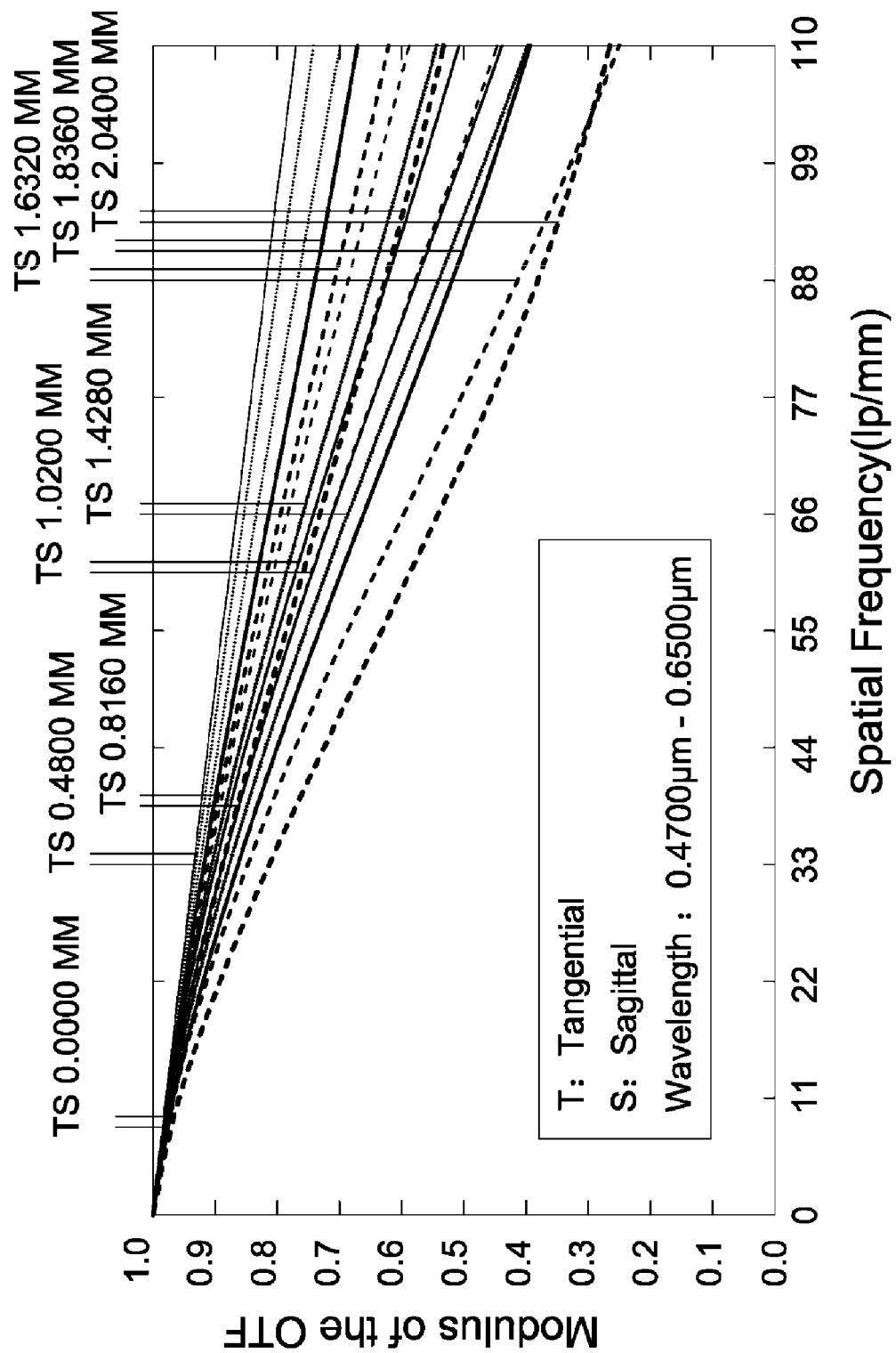
FIG. 6C is a modulation transfer function diagram of the lens assembly in accordance with the third embodiment of the invention.

By the above arrangements of the lenses and stop ST3, the lens assembly 3 of the third embodiment can meet the requirements of optical performance as seen in FIGS. 6A-6C, wherein FIG. 6A shows a field curvature diagram of the lens assembly 3 in accordance with the third embodiment of the invention, FIG. 6B shows a distortion diagram of the lens assembly 3 in accordance with the third embodiment of the invention, and FIG. 6C shows a modulation transfer function diagram of the lens assembly 3 in accordance with the third embodiment of the invention.

It can be seen from FIG. 6A that the field curvature of tangential direction and sagittal direction in the lens assembly 3 of the third embodiment ranges from −0.04 mm to 0.05 mm.

It can be seen from FIG. 6B that the distortion in the lens assembly 3 of the third embodiment ranges from −4% to 0%.

It can be seen from FIG. 6C that the modulation transfer function of tangential direction and sagittal direction in the lens assembly 3 of the third embodiment ranges from 0.25 to 1.0.

It is obvious that the field curvature and the distortion of the lens assembly 3 of the third embodiment can be corrected effectively, and the resolution of the lens assembly 3 of the third embodiment can meet the requirement. Therefore, the lens assembly 3 of the third embodiment is capable of good optical performance.

Figure 7:
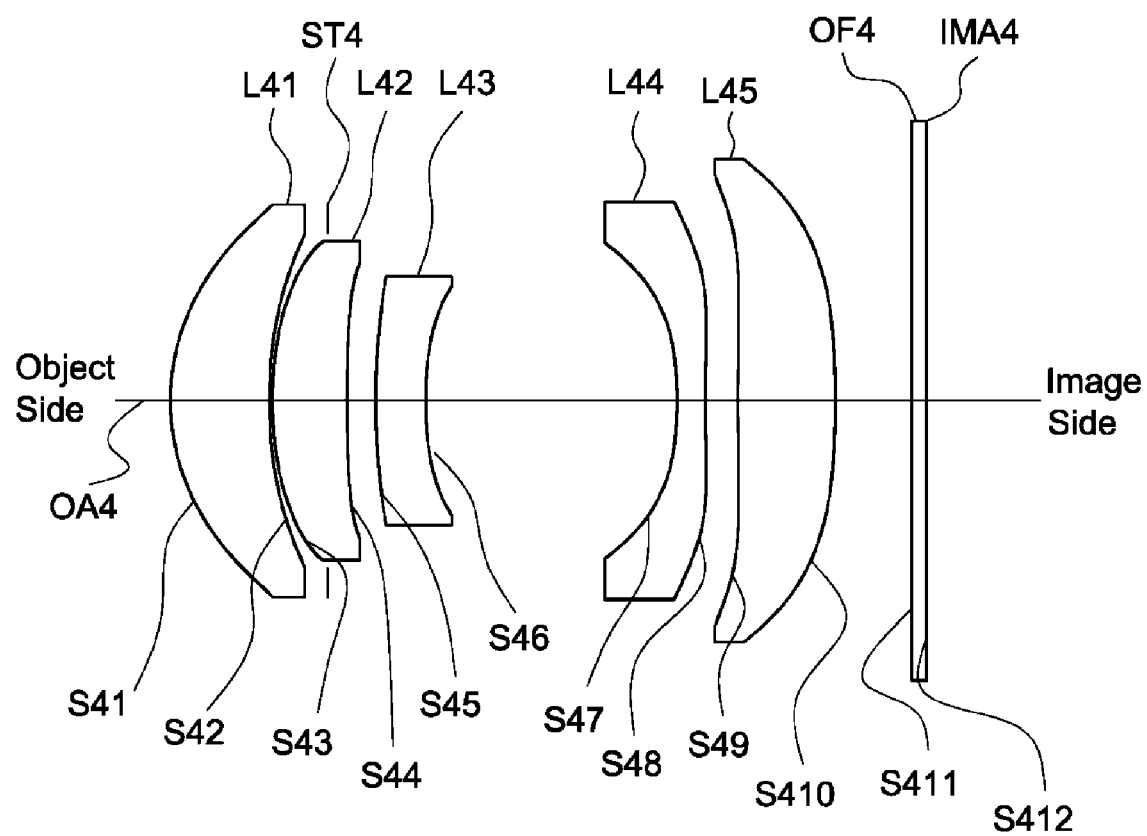
FIG. 7 is a lens layout diagram of a lens assembly in accordance with a fourth embodiment of the invention.

Referring to FIG. 7, FIG. 7 is a lens layout diagram of a lens assembly in accordance with a fourth embodiment of the invention. The lens assembly 4 includes a first lens L41, a stop ST4, a second lens L42, a third lens L43, a fourth lens L44, a fifth lens L45, and an optical filter OF4, all of which are arranged in order from an object side to an image side along an optical axis OA4. In operation, an image of light rays from the object side is formed at an image plane IMA4.

According to the foregoing, the surface profiles of the second lens L42, the third lens L43, the fourth lens L44, and the fifth lens L45 approximate to that of the second lens L12, the third lens L13, the fourth lens L14, and the fifth lens L15 of the lens assembly 1 of the first embodiment respectively, and is not described here again; and both of the object side surface S411 and image side surface S412 of the optical filter OF4 are plane surfaces.

Table 10 shows the optical specification of the lens assembly 4 in FIG. 7.

TABLE 10

Effective Focal Length = 6.84319 mm
F-number = 2.49
Total Lens Length = 5.76075 mm
Field of View = 33.18 Degrees

| Surface Number | Radius of Curvature (mm) | Thickness (mm) | Nd | Vd | Effective Focal Length (mm) | Remark |
|---|---|---|---|---|---|---|
| S41 | 1.679571 | 0.755174 | 1.54 | 56.0 | 5.088927 | The First Lens L41 |
| S42 | 3.57549 | 0.02368 | | | | |
| S43 | 2.858568 | 0.565024 | 1.54 | 56.0 | 7.037286 | The Second Lens L42 (Stop ST4) |
| S44 | 10.40276 | 0.224379 | | | | |
| S45 | 8.903178 | 0.374815 | 2 | 19.3 | -4.09962 | The Third Lens L43 |
| S46 | 2.768467 | 1.91749 | | | | |
| S47 | -3.0446 | 0.215466 | 1.54 | 56.0 | -3.998369 | The Fourth Lens L44 |
| S48 | 7.9012 | 0.248845 | | | | |
| S49 | 29.38008 | 0.740976 | 1.65 | 21.5 | 10.777318 | The Fifth Lens L45 |
| S410 | -9.22476 | 0.584905 | | | | |
| S411 | ∞ | 0.11 | 1.52 | 64.17 | | Optical Filter OF4 |
| S412 | ∞ | 0 | | | | |

The definition of aspheric surface sag z of each lens in table 10 is the same as that of in Table 1, and is not described here again.

In the fourth embodiment, the conic constant k and the aspheric coefficients A, B, C, D, E, F, G of each surface are shown in Table 11.

TABLE 11

| Surface Number | k | A<br>E | B<br>F | C<br>G | D |
|---|---|---|---|---|---|
| S41 | -0.34426 | 0.00213497<br>0.00018389 | 0.00073429<br>-0.00003138 | 0.00099054<br>-0.00005322 | -0.0005468 |

TABLE 11-continued

| Surface Number | k | A<br>E | B<br>F | C<br>G | D |
|---|---|---|---|---|---|
| S42 | 0.892517 | 0.00257441<br>−0.00333402 | 0.00899751<br>−0.00019652 | 0.0029411<br>0.0003345 | 0.00114214 |
| S43 | 3.57541 | −0.00494938<br>0.00024745 | 0.00567764<br>0.00045756 | 0.00170956<br>−0.00017565 | −0.00010328 |
| S44 | 77.48973 | 0.00188307<br>0.00486065 | −0.0001843<br>0.00179145 | 0.0049158<br>−0.002238 | 0.00533637 |
| S45 | 65.08642 | 0.01017187<br>0.00311186 | 0.00739172<br>0.00461129 | −0.0059506<br>−0.00994519 | −0.00584979 |
| S46 | 6.815724 | 0.02944213<br>0.01218638 | 0.00522302<br>0.0094372 | 0.01672368<br>−0.05006252 | −0.03654948 |
| S47 | 4.170498 | −0.13587778<br>0.00379199 | −0.00834566<br>0.00064335 | 0.01816066<br>−0.00146354 | −0.00080001 |
| S48 | −56.3291 | −0.0876385<br>0.00140635 | −0.00812301<br>−0.00047792 | 0.0074045<br>−0.00000655 | −0.00048469 |
| S49 | 49.71398 | −0.00566694<br>0.00025608 | −0.01028033<br>0.00007924 | −0.00122767<br>−0.0000267 | 0.00004155 |
| S410 | 11.29885 | −0.060706<br>−0.00000191 | 0.01356789<br>0.00000267 | −0.00180965<br>0.00000607 | −0.00042743 |

Table 12 shows the parameters and condition values for conditions (1)-(9) in accordance with the fourth embodiment of the invention. It can be seen from Table 12 that the lens assembly 4 of the fourth embodiment satisfies the conditions (1)-(9).

TABLE 12

| $f_{12}$ | 3.13327 mm | $f_{123}$ | 5.37521 mm | $T_5$ | 0.740976 mm |
|---|---|---|---|---|---|
| $TC_{34}$ | 1.91749 mm | | | | |
| $(R_{51} - R_{52})/(R_{51} + R_{52})$ | 1.92 | $f_{12}/f_5$ | 0.29 | $f_{123}/f_5$ | 0.50 |
| $f \times (TC_{34}/T_5)$ | 17.71 mm | $(R_{51} - R_{52})/f$ | 5.64 | $f_5/TC_{34}$ | 5.62 |
| $TTL/(f_5 - f_2)$ | 1.54 | $f_5 - f_2$ | 3.74 mm | $R_{52}/T_5$ | −12.45 |

Figure 8A:
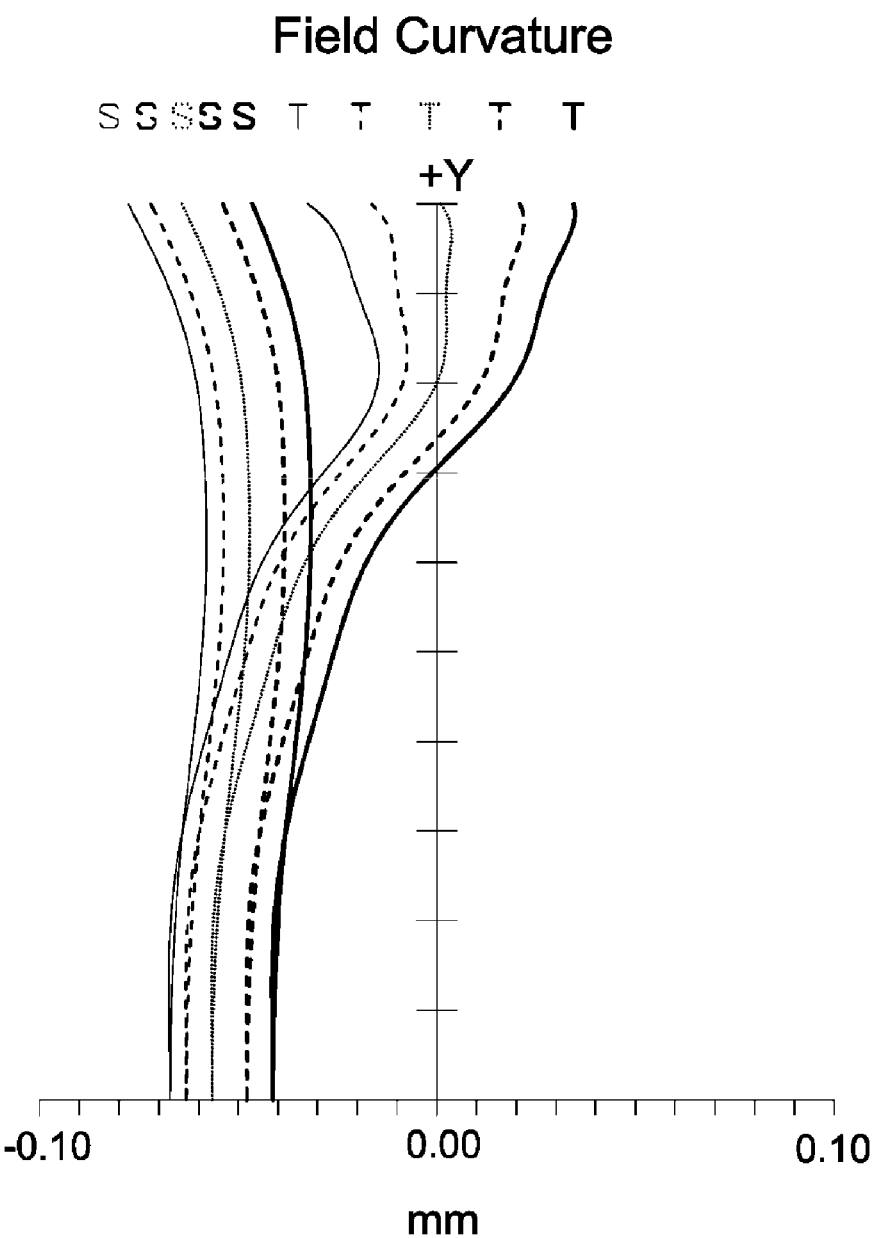
FIG. 8A depicts a field curvature diagram of a lens assembly in accordance with the fourth embodiment of the invention.
Figure 8B:
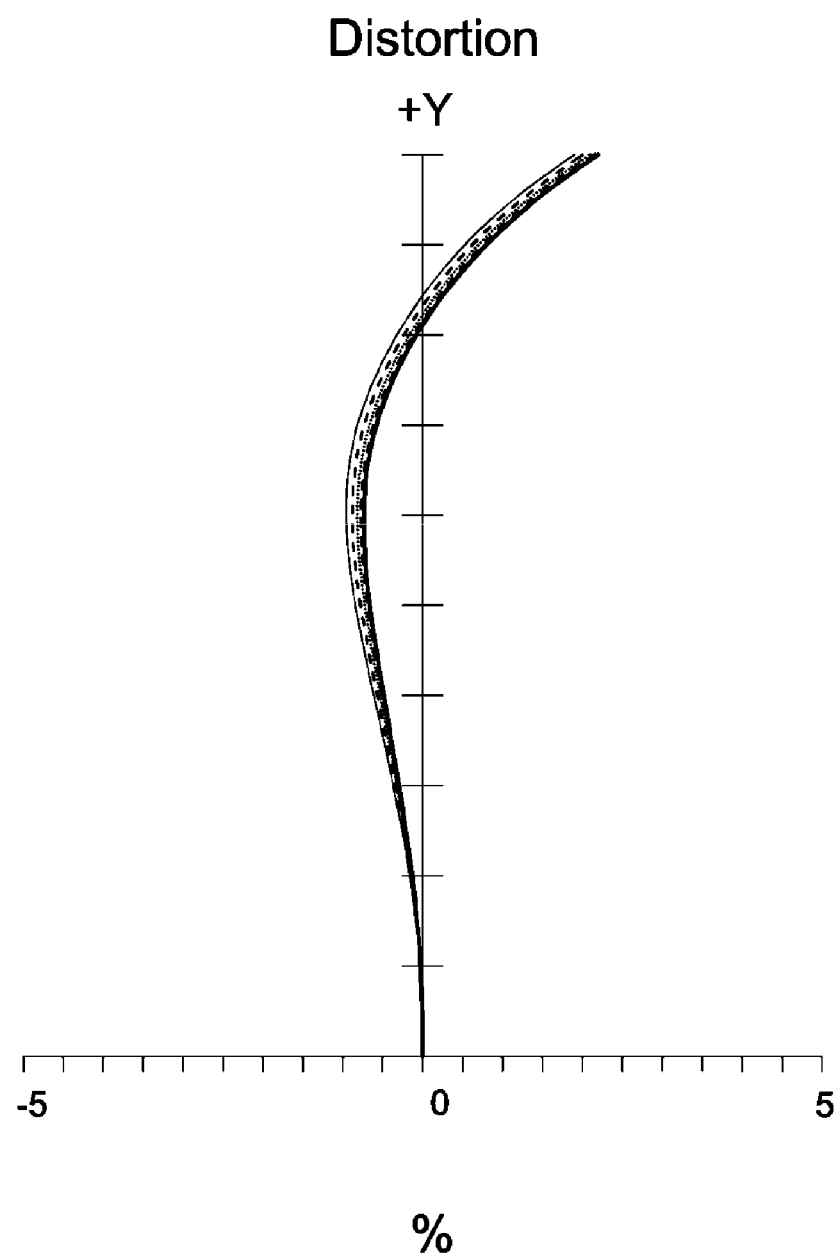
FIG. 8B is a distortion diagram of the lens assembly in accordance with the fourth embodiment of the invention.
Figure 8C:
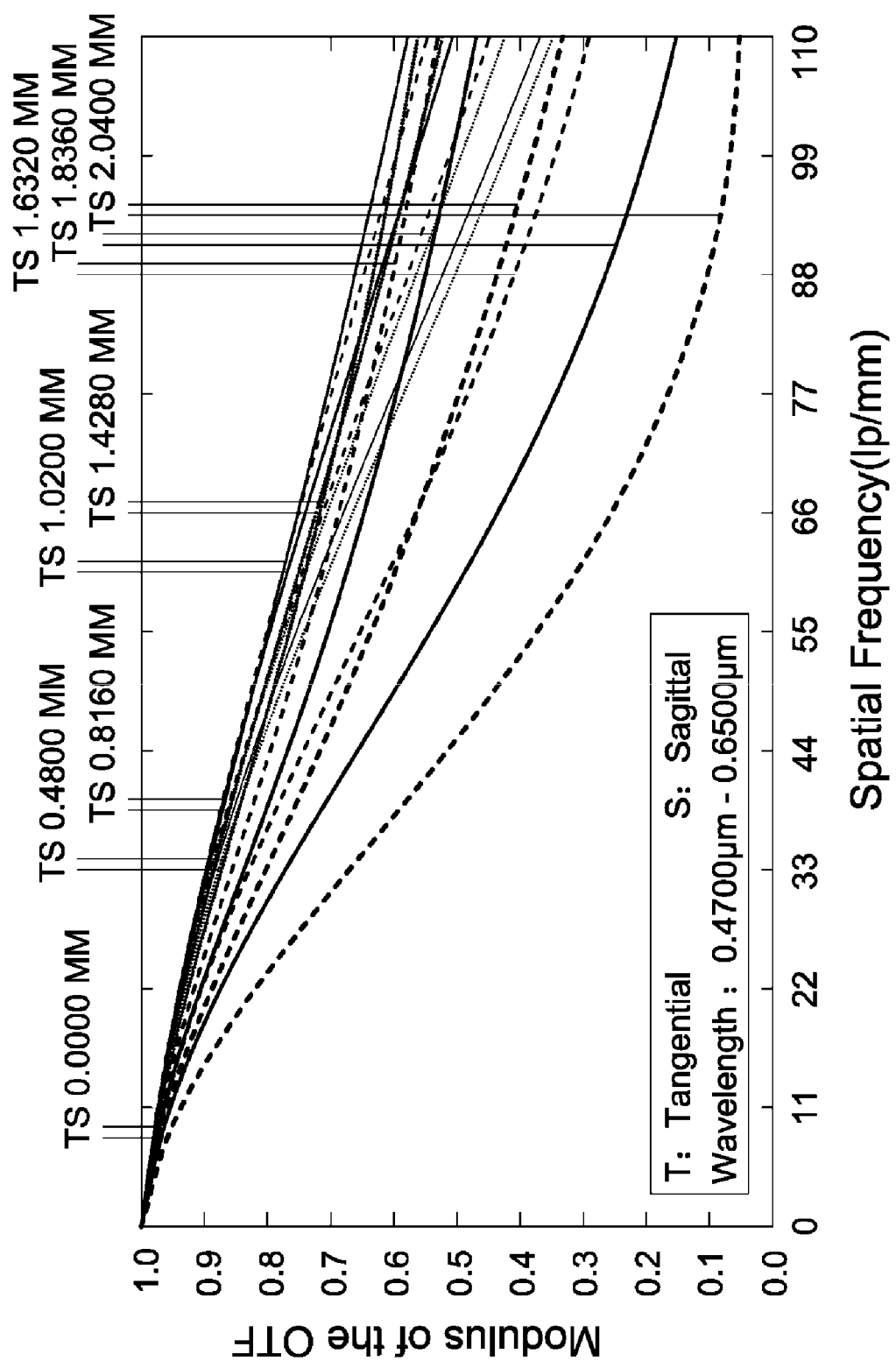
FIG. 8C is a modulation transfer function diagram of the lens assembly in accordance with the fourth embodiment of the invention.

By the above arrangements of the lenses and stop ST4, the lens assembly 4 of the fourth embodiment can meet the requirements of optical performance as seen in FIGS. 8A-8C, wherein FIG. 8A shows a field curvature diagram of the lens assembly 4 in accordance with the fourth embodiment of the invention, FIG. 8B shows a distortion diagram of the lens assembly 4 in accordance with the fourth embodiment of the invention, and FIG. 8C shows a modulation transfer function diagram of the lens assembly 4 in accordance with the fourth embodiment of the invention.

It can be seen from FIG. 8A that the field curvature of tangential direction and sagittal direction in the lens assembly 4 of the fourth embodiment ranges from −0.08 mm to 0.04 mm.

It can be seen from FIG. 8B that the distortion in the lens assembly 4 of the fourth embodiment ranges from −1% to 3%.

It can be seen from FIG. 8C that the modulation transfer function of tangential direction and sagittal direction in the lens assembly 4 of the fourth embodiment ranges from 0.06 to 1.0.

It is obvious that the field curvature and the distortion of the lens assembly 4 of the fourth embodiment can be corrected effectively, and the resolution of the lens assembly 4 of the fourth embodiment can meet the requirement. Therefore, the lens assembly 4 of the fourth embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
a first lens which is with positive refractive power and comprises a convex surface facing an object side and a concave surface facing an image side;
a second lens which is with positive refractive power;
a third lens which is with negative refractive power and comprises a convex surface facing the object side;
a fourth lens which is with negative refractive power and comprises a concave surface facing the object side; and
a fifth lens which is with positive refractive power and comprises a convex surface facing the image side;
wherein the first lens, the second lens, the third lens, the fourth lens, and the fifth lens are arranged in order from the object side to the image side along an optical axis;
wherein the lens assembly satisfies following conditions:

$-13 < R_{52}/T_5 < -8$;

$0.5 \text{ mm} \leq f_5 - f_2 < 4 \text{ mm}$;

wherein $R_{52}$ is a radius of curvature of the convex surface of the fifth lens, $T_5$ is a thickness of the fifth lens along the optical axis, $f_2$ is an effective focal length of the second lens, and $f_5$ is an effective focal length of the fifth lens;
wherein any two adjacent lenses selected from the first, second, third, fourth and fifth lenses have an air gap provided therebetween.

2. The lens assembly as claimed in claim 1, wherein:
the second lens comprises a convex surface facing the object side and a concave surface facing the image side; and
the third lens further comprises a concave surface facing the image side.

3. The lens assembly as claimed in claim 2, wherein:
the fourth lens further comprises another concave surface facing the image side; and
the fifth lens further comprises another convex surface facing the object side.

4. The lens assembly as claimed in claim 1, wherein the lens assembly satisfies:

$$12 \text{ mm} < f \times (TC_{34}/T_5) < 20 \text{ mm};$$

wherein f is an effective focal length of the lens assembly, $T_5$ is a thickness of the fifth lens along the optical axis, and $TC_{34}$ is an air interval from an image side surface of the third lens to the concave surface of the fourth lens along the optical axis.

5. The lens assembly as claimed in claim 1, wherein the lens assembly satisfies:

$$0 < f_{123}/f_5 < 1;$$

wherein $f_5$ is an effective focal length of the fifth lens and $f_{123}$ is an effective focal length of a combination of the first lens, the second lens, and the third lens.

6. The lens assembly as claimed in claim 1, wherein the lens assembly satisfies at least one of the following conditions:

$$3 < f_5/TC_{34} < 6.5;$$

$$0.5 < TTL/(f_5 - f_2) < 7;$$

wherein $f_2$ is an effective focal length of the second lens, $f_5$ is an effective focal length of the fifth lens, $TC_{34}$ is an air interval from an image side surface of the third lens to the concave surface of the fourth lens along the optical axis, and TTL is an interval from the convex surface of the first lens to an image plane along the optical axis.

7. The lens assembly as claimed in claim 3, wherein the lens assembly satisfies at least one of the following conditions:

$$1 < (R_{51} - R_{52})/(R_{51} + R_{52}) < 10;$$

$$0 < f_{12}/f_5 < 1;$$

$$2 < (R_{51} - R_{52})/f < 7;$$

wherein $R_{51}$ is a radius of curvature of the convex surface of the fifth lens, $R_{52}$ is a radius of curvature of the another convex surface of the fifth lens, f is an effective focal length of the lens assembly, $f_5$ is an effective focal length of the fifth lens, and $f_{12}$ is an effective focal length of a combination of the first lens and the second lens.

8. A lens assembly comprising:
a first lens which is with positive refractive power and comprises a convex surface facing an object side and a concave surface facing an image side;
a second lens which is with positive refractive power;
a third lens which is with negative refractive power;
a fourth lens which is with negative refractive power and comprises a concave surface facing the object side; and
a fifth lens which is with positive refractive power and comprises a convex surface facing the image side;
wherein the first lens, the second lens, the third lens, the fourth lens, and the fifth lens are arranged in order from the object side to the image side along an optical axis;
wherein the lens assembly satisfies following conditions:

$$0.5 \text{ mm} < f_5 - f_2 < 4 \text{ mm};$$

$$-13 < R_{52}/T_5 < -8;$$

wherein $f_2$ is an effective focal length of the second lens, $f_5$ is an effective focal length of the fifth lens, $R_{52}$ is a radius of curvature of the convex surface of the fifth lens, and $T_5$ is a thickness of the fifth lens along the optical axis.

9. The lens assembly as claimed in claim 8, wherein:
the second lens comprises a convex surface facing the object side and a concave surface facing the image side; and
the third lens comprises a convex surface facing the object side and a concave surface facing the image side.

10. The lens assembly as claimed in claim 9, wherein:
the fourth lens further comprises another concave surface facing the image side; and
the fifth lens further comprises another convex surface facing the object side.

11. The lens assembly as claimed in claim 8, wherein the lens assembly satisfies:

$$12 \text{ mm} < f \times (TC_{34}/T_5) < 20 \text{ mm};$$

wherein f is an effective focal length of the lens assembly, $T_5$ is a thickness of the fifth lens along the optical axis, and $TC_{34}$ is an air interval from an image side surface of the third lens to the concave surface of the fourth lens along the optical axis.

12. The lens assembly as claimed in claim 10, wherein the lens assembly satisfies:

$$0 < f_{123}/f_5 < 1;$$

wherein $f_5$ is an effective focal length of the fifth lens and $f_{123}$ is an effective focal length of a combination of the first lens, the second lens, and the third lens.

13. The lens assembly as claimed in claim 9, wherein the lens assembly satisfies at least one of the following conditions:

$$1 < (R_{51} - R_{52})/(R_{51} + R_{52}) < 10;$$

$$2 < (R_{51} - R_{52})/f < 7;$$

$$0.5 < TTL/(f_5 - f_2) < 7;$$

$$-13 < R_{52}/T_5 < -8;$$

$$0 < f_{12}/f_5 < 1;$$

$$3 < f_5/TC_{34} < 6.5;$$

wherein $R_{51}$ is a radius of curvature of an object surface of the fifth lens, $R_{52}$ is a radius of curvature of the convex surface of the fifth lens, $f_2$ is the effective focal length of the second lens, $f_5$ is the effective focal length of the fifth lens, f is an effective focal length of the lens assembly, $T_5$ is a thickness of the fifth lens along the optical axis, TTL is an interval from the convex surface of the first lens to an image plane along the optical axis, $f_{12}$ is an effective focal length of a combination of the first lens and the second lens, and $TC_{34}$ is an air interval from an image side surface of the third lens to the concave surface of the fourth lens along the optical axis.

14. A lens assembly comprising:
a first lens which is with positive refractive power and comprises a convex surface facing an object side and a concave surface facing an image side;
a second lens which is with positive refractive power;
a third lens which is with negative refractive power and comprises a convex surface facing the object side;

a fourth lens which is with negative refractive power and comprises a concave surface in a paraxial region facing the object side and another concave surface in a paraxial region facing the image side; and a fifth lens which is with positive refractive power and comprises a convex surface in a paraxial region facing the object side and another convex surface facing the image side;

wherein the first lens, the second lens, the third lens, the fourth lens, and the fifth lens are arranged in order from the object side to the image side along an optical axis;

wherein the lens assembly satisfies following condition:

$0.5 \text{ mm} < f_5 - f_2 < 4 \text{ mm};$ wherein $f_2$ is an effective focal length of the second lens and $f_5$ is an effective focal length of the fifth lens;

wherein any two adjacent lenses selected from the first, second, third, fourth and fifth lenses have an air gap provided there between.

\* \* \* \* \*